(12) United States Patent
Iwai et al.

(10) Patent No.: US 6,805,620 B2
(45) Date of Patent: Oct. 19, 2004

(54) GRINDSTONE HAVING RESINOID ABRASIVE STRUCTURE INCLUDING ABRASIVE AGGLOMERATES EACH PROVIDED BY VITRIFIED ABRASIVE STRUCTURE

(75) Inventors: Kouji Iwai, Kasugai (JP); Tsuguo Kusakabe, Okazaki (JP); Yasushi Sato, Gifu (JP)

(73) Assignee: Noritake Co., Limited, Nagoya (JP)

( * ) Notice: Subject to any disclaimer, the term of this patent is extended or adjusted under 35 U.S.C. 154(b) by 0 days.

(21) Appl. No.: 10/464,753

(22) Filed: Jun. 19, 2003

(65) Prior Publication Data

US 2004/0176019 A1 Sep. 9, 2004

(30) Foreign Application Priority Data

Mar. 7, 2003 (JP) ........................................ 2003-062428

(51) Int. Cl.$^7$ ................................................ B24B 5/00
(52) U.S. Cl. ........................................ 451/219; 451/541
(58) Field of Search .................................. 451/219, 147, 451/148, 541, 548; 51/298, 307, 309, 293

(56) References Cited

U.S. PATENT DOCUMENTS

| | | | | | |
|---|---|---|---|---|---|
| 6,086,467 | A | * | 7/2000 | Imai et al. | 451/541 |
| 6,093,225 | A | * | 7/2000 | Itoh | 51/295 |
| 6,440,185 | B2 | * | 8/2002 | Nagata et al. | 51/298 |
| 6,450,870 | B2 | * | 9/2002 | Ito | 451/542 |
| 6,562,089 | B1 | * | 5/2003 | Iwai et al. | 51/298 |

FOREIGN PATENT DOCUMENTS

JP        A 2001-121425        5/2001

* cited by examiner

*Primary Examiner*—Dung Van Nguyen
(74) *Attorney, Agent, or Firm*—Oliff & Berridge, PLC

(57) ABSTRACT

A resinoid grindstone including a main body having an abrasive structure in which abrasive agglomerates are held together by a resin bond. Each of the abrasive agglomerates includes abrasive grains which are held together by an inorganic bond. The resin bond includes a filler such that a ratio of a strength of the abrasive agglomerates to a strength of the resin bond is not higher than 1.5. A ratio of a total weight of the abrasive agglomerates included in the abrasive structure, to a weight of the abrasive structure is not lower than 10% and is not higher than 40%.

13 Claims, 7 Drawing Sheets

GRINDSTONE HAVING RESINOID ABRASIVE STRUCTURE INCLUDING ABRASIVE AGGLOMERATES EACH PROVIDED BY VITRIFIED ABRASIVE STRUCTURE

BACKGROUND OF THE INVENTION

1. Field of the Invention

The present invention relates in general to a grindstone, such as a gear-tooth honing stone, having a resinoid abrasive structure including abrasive agglomerates each of which is provided by a vitrified abrasive structure.

2. Discussion of the Related Art

A gear-tooth honing operation is known as a hardened-gear finishing operation that is intended to reduce the noise of spur or helical gears (e.g., which are to be used in a vehicle transmission unit) after their heat treatment. That is, such a gear-tooth honing operation is effected for removing a distortion of the gear caused during the heat treatment, and for improving accuracy of each tooth of the gear. As a gear-tooth honing stone used in the gear-tooth honing operation, there is known a resinoid grindstone in the form of an internally-toothed honing wheel having an annular main body provided by an abrasive structure in which standard abrasive grains such as alumina oxide grains and silicon carbide grains are held together by a binder including a resin bond that is made of a thermosetting resin such as phenol and epoxy. The annular main body has, in its inner circumferential surface, a teeth profile portion which is to be meshed with external teeth of a gear as a workpiece. Such an internally-toothed honing wheel is subjected to a dressing operation with a dressing gear having a surface on which diamond abrasive grains are fixed in an electrodeposition method. In a honing operation executed after the dressing operation, the work gear is brought into engagement at its external teeth with the teeth profile portion of the internally-toothed honing wheel, and is rotated about its axis while being reciprocated in the axial direction, whereby the surface of each tooth of the work gear is ground or honed.

The resinoid grindstone is elastically deformed in a larger amount when a grinding load is applied thereto, than a vitrified grindstone. Further, the resinoid grindstone has a smaller degree of strength for holding or bonding the abrasive grains together, and a lower degree of wear resistance than the vitrified grindstone. Due to such characteristics thereof, the resinoid grindstone is not capable of satisfying a recent demand for grinding or removing a larger volume of stock from a workpiece with a higher efficiency, even where the abrasive structure of the resinoid grindstone is modified to have a higher density and a higher grade (that corresponds to the degree of strength with which the binder or bond holds the abrasive grains in the bond setting).

Where the resinoid grindstone takes the form of a honing stone (like the above-described internally-toothed honing wheel) having a teeth profile which is formed in its outer or inner circumferential surface and which conforms to teeth of a gear to be honed or ground as a workpiece, the honing stone has to be periodically or cyclically dressed so as to maintain its teeth profile so that the shape of the gear teeth finished by the honing stone is maintained. That is, when the teeth profile is changed to a certain extent due to wear of the honing stone, or when the amount of wear of the honing stone exceeds a predetermined amount, the honing stone has to be subjected to a dressing operation for rectifying or reshaping the teeth profile. The dressing cycle or interval is closely related with a service life of the honing stone. The wear resistance of the honing stone could be improved by using a resinoid grindstone of a high grade. However, such a resinoid grindstone having the high grade does not have a high degree of sharpness and is not accordingly capable of removing a large volume of stock from a workpiece with a high efficiency.

SUMMARY OF THE INVENTION

The present invention was made in the light of the background art discussed above. It is therefore an object of the present invention to provide a resinoid grindstone or a gear-tooth honing stone which has a high degree of wear resistance and is capable of removing a large amount of stock with a high efficiency. This object of the invention may be achieved according to any one of the first through fourteenth aspects of the invention which are described below.

The first aspect of this invention provides a resinoid grindstone comprising a main body having an abrasive structure in which abrasive agglomerates are held together by a binder including a resin bond, wherein each of the abrasive agglomerates includes abrasive grains which are held together by an inorganic bond, and wherein the binder further includes a filler such that a ratio of a strength of the abrasive agglomerates to a strength of the binder is not higher than 1.5.

In the resinoid grindstone according to this first aspect of the invention, each of the abrasive agglomerates included in the resinoid abrasive structure is provided by the plurality of abrasive grains held together by the inorganic bond, so that each abrasive agglomerate has a size larger than that of each of the abrasive grains included in each abrasive agglomerate. Each of the abrasive agglomerates, which are held by the resin binder, has a high rigidity owing to its vitrified abrasive structure. That is, the high rigidity of each abrasive agglomerate enables the present resinoid grindstone to have a large depth of cut with respect to a workpiece, while the resinoid grindstone as a whole has a certain degree of elasticity owing to the resinoid abrasive structure. Although each abrasive agglomerate is held together by the rein binder, each abrasive agglomerate having the relatively large size is supported at its relatively large area by the binder so that each abrasive agglomerate is not displaced by a large distance away from the workpiece during a grinding operation. Owing to this relatively large size of each abrasive agglomerate and presence of pores in the vitrified abrasive structure of each abrasive agglomerate, the resinoid grindstone is capable of removing a large amount of stock from the workpiece with a high efficiency. Further, owing to the relatively large size and also concavities and convexities in the surface of each abrasive agglomerate, each abrasive agglomerate is held together by the binder with a high bonding strength, thereby reducing removal of the abrasive agglomerates from the resinoid abrasive structure and accordingly improving the wear resistance.

Further, in the resinoid grindstone of this first aspect of the invention, the strength of the binder is increased by the incorporation of the filler in the binder such that the ratio of the strength of the abrasive agglomerates to the strength of the binder is not higher than 1.5. This arrangement makes it possible to improve a surface smoothness of the ground workpiece with a reduced risk of damaging or scratching the surface of the ground workpiece. Moreover, this arrangement serves to prolong the service life of a dressing tool which is used to dress the grindstone. It is noted that a content of the resin bond (included in the binder), a content of the abrasive agglomerates and a content of the filler (included in the binder) are preferably 15–30 wt %, 10–40 wt % and 40–75 wt %. This preferable proportions of the components are effective to further improve the grinding efficiency and the durability of the resinoid grindstone.

According to the second aspect of the invention, in the resinoid grindstone defined in the first aspect of the invention, the strength of the abrasive agglomerates is smaller than the strength of the binder. Namely, the ratio of the strength of the abrasive agglomerates to the strength of the binder is lower than 1.0., so that the surface smoothness of the ground workpiece is further improved with a further reduced risk of damaging or scratching the surface of the workpiece. Further, the service life of the dressing tool is further prolonged.

According to the third aspect of the invention, in the resinoid grindstone defined in the first or second aspect of the invention, the filler is provided by second abrasive grains each having a size which is not smaller than a size of each of the abrasive grains as first abrasive grains included in each of the abrasive agglomerates.

The fourth aspect of the invention provides a gear-tooth honing stone comprising a main body having a teeth profile portion to be meshed with a gear, for honing the gear, wherein the main body has an abrasive structure in which abrasive agglomerates are held together by a binder including a resin bond, wherein each of the abrasive agglomerates includes abrasive grains which are held together by an inorganic bond, and wherein the binder further includes a filler such that a ratio of a strength of the abrasive agglomerates to a strength of the binder is not higher than 1.5.

The gear-tooth honing stone of this fourth aspect of the invention provides substantially the same technical advantages as the grindstone of the first aspect of the invention. The advantage in prolonging the service life of the dressing tool is very significant, because a teeth-profiled dressing tool (dressing gear), which is expensive due to the electrodeposition of diamond abrasive grains on its surface, is used as the dressing tool to dress the gear-tooth honing stone.

According to the fifth aspect of the invention, in the gear-tooth honing stone defined in the fourth aspect of the invention, the strength of the abrasive agglomerates is smaller than the strength of the binder.

According to the sixth aspect of the invention, in the gear-tooth honing stone defined in the fourth or fifth aspect of the invention, the filler is provided by second abrasive grains each having a size which is not smaller than a size of each of the abrasive grains as first abrasive grains included in each of the abrasive agglomerates.

According to the seventh aspect of the invention, in the gear-tooth honing stone defined in the fourth through sixth aspects of the invention, the main body consists of an annular body, wherein the teeth profile portion is provided by a succession of protrusions formed in an inner circumferential surface of the annular body.

The eighth aspect of the invention provides a resinoid grindstone comprising a main body having an abrasive structure in which abrasive agglomerates are held together by a binder including a resin bond, wherein each of the abrasive agglomerates includes abrasive grains which are held together by an inorganic bond, and wherein a ratio of a total weight of the abrasive agglomerates included in the abrasive structure, to a weight of the abrasive structure is not lower than 10% and is not higher than 40%.

In the resinoid grindstone according to this eighth aspect of the invention in which a content of the abrasive agglomerates in the resinoid abrasive structure is 10–40 wt %, it is possible to enjoy the technical advantages provided by the abrasive agglomerates while preventing a reduction in a mechanical strength of the abrasive structure which would be caused by an excessively high content of the abrasive agglomerates. If the content of the abrasive agglomerates in the abrasive structure is lower than 10 wt %, an amount of the abrasive agglomerates exposed in a grinding surface of the grindstone is so small that the technical advantages of the abrasive agglomerates can not be practically enjoyed in a grinding operation. If the content of the abrasive agglomerates in the abrasive structure is higher than 40 wt %, a bonding strength of the abrasive structure of the grindstone is reduced to such an extent that makes it impossible to provide the abrasive structure of the grindstone with a required degree of mechanical strength, since the vitrified abrasive structure providing each abrasive agglomerate is more fragile or brittle than a resin structure. With the content of the abrasive agglomerates being within the above-described range 10–40 wt %, the reduction of the bonding strength of the grindstone is avoided whereby the required degree of mechanical strength is assured.

According to the ninth aspect of the invention, in the resinoid grindstone defined in the eighth aspect of the invention, the ratio of the total weight of the abrasive agglomerates included in the abrasive structure, to the weight of the abrasive structure is not higher than 30%.

The technical effect provided by the abrasive agglomerates generally increases with an increase in the content of the abrasive agglomerates in the resinoid abrasive structure. However, a further increase in the content of the abrasive agglomerates over 30 wt % no longer produces an appreciable increase in the technical effect. In this respect, it is preferable that the content of the abrasive agglomerates is not lower than 10 wt % and is not higher than 30 wt %, for thereby more reliably assuring the required degree of the mechanical strength of the main body of the grindstone, while maintaining a sufficiently high degree of machining ability of the grindstone.

According to the tenth aspect of the invention, in the resinoid grindstone defined in the eighth or ninth aspect of the invention, a ratio of a weight of the inorganic bond included in each of the abrasive agglomerates, to a weight of each of the abrasive agglomerates is not higher than 40%.

A suitable degree of hardness of each abrasive agglomerate is determined in view of a material of a workpiece to be ground and also a required degree of quality of the ground workpiece. In the resinoid grindstone of this tenth aspect of the invention in which the content of the inorganic bond in each abrasive agglomerate is not higher than 40 wt %, it is possible to prevent each of the abrasive agglomerates from having an excessively large hardness, and accordingly to avoid a deterioration in a surface smoothness of the ground workpiece. For obtaining a high degree of surface smoothness of the ground workpiece with minimized scratches on the ground surface, it is not desirable to excessively increase the hardness of each abrasive agglomerate that is dependent on the content of the inorganic bond in each abrasive agglomerate. It is preferable that the upper limit of the inorganic bond content is determined such that the mechanical strength of the abrasive agglomerates is lower than the mechanical strength of the binder, i.e., the mechanical strength of portions of the resinoid abrasive structure excluding the abrasive agglomerates.

According to the eleventh aspect of the invention, in the resinoid grindstone defined in the tenth aspect of the invention, the ratio of the weight of the inorganic bond included in each of the abrasive agglomerates, to the weight of each of the abrasive agglomerates is not lower than 5%.

An excessive reduction in the inorganic bond content leads to an easy destruction of each abrasive agglomerate. In this respect, if the content of the inorganic bond in each abrasive agglomerate is lower than 5 wt %, it is not possible to obtain a sufficiently high degree of durability of the grindstone in spite of the presence of the abrasive agglomerates in the abrasive structure of the grindstone. Therefore, the content of the inorganic bond in each abrasive agglomerate is preferably is at least 5 wt %, more preferably at least 10 wt %, for reliably obtaining the technical effect provided by the present of the abrasive agglomerates. Further, the inorganic bond content in each abrasive agglomerate is preferably not higher than 20 wt %, more preferably about 15 wt %, so that a sufficiently high degree of durability of the grindstone is obtained without suffering from a deterioration in the surface smoothness of the ground workpiece.

According to the twelfth aspect of the invention, in the resinoid grindstone defined in any one of the eighth through eleventh aspects of the invention, the binder includes second abrasive grains each having a size which is not smaller than a size of each of the abrasive grains as first abrasive grains included in each of the abrasive agglomerates, and which is smaller than a size of each of the abrasive agglomerates.

In the resinoid grindstone of this twelfth aspect of the invention in which the resinoid abrasive structure contains the multiplicity of second abrasive grains as well as the multiplicity of abrasive agglomerates, the second abrasive grains as well as the abrasive agglomerates are dispersed in the resin bond, the resinoid abrasive structure advantageously possesses further higher degrees of grade and structure density (grain percentage). Moreover, the arrangement, in which the grain size of the first abrasive grains constituting each abrasive agglomerate is smaller than the grain size of the second abrasive grains, is significant for improving surface smoothness of the ground workpiece. This is because the workpiece is ground mainly by the first abrasive grains rather than by the second abrasive grains, since the size of each of the abrasive agglomerates constituted by the first abrasive grains is larger than each of the second abrasive grains.

According to the thirteenth aspect of the invention, in the resinoid grindstone defined in any one of the eighth through twelfth aspects of the invention, the resinoid grindstone being a gear-tooth honing stone, wherein the main body has a teeth profile portion to be meshed with a gear, for honing the gear.

The principle of the invention is advantageously applied to a case where the resinoid grindstone is provided by the gear-tooth honing stone, as in this thirteenth aspect of the invention, which is commonly adapted to possess a high grade and a high degree of wear resistance required for grinding or honing the workpiece in the form of a gear having a surface hardened by a heat treatment. That is, in spite of the high grade and the high degree of wear resistance, the resinoid grindstone has a so-called spontaneous edge-forming capability or self-sharpening capability owing to the vitrified abrasive structure of each abrasive agglomerate in which the first abrasive grains are held together by the inorganic bond. The self-sharpening capability is a capability for restoring the sharpness of the grindstone from time to time by successive removals of the first abrasive grains from the abrasive agglomerate or small breakages of the first abrasive grains, and makes it possible to abrade the workpiece in such a manner that removes a large amount of stock with high efficiency and accuracy.

According to the fourteenth aspect of the invention, in the resinoid grindstone defined in the thirteenth aspect of the invention, the main body consists of an annular body, and wherein the teeth profile portion is provided by a succession of protrusions formed in an inner circumferential surface of the annular body.

BRIEF DESCRIPTION OF THE DRAWINGS

The above and other objects, features, advantages and technical and industrial significance of this invention will be better understood by reading the following detailed description of the presently preferred embodiment of the invention, when considered in connection with the accompanying drawings, in which.

DETAILED DESCRIPTION OF THE PREFERRED EMBODIMENT

Figure 1:
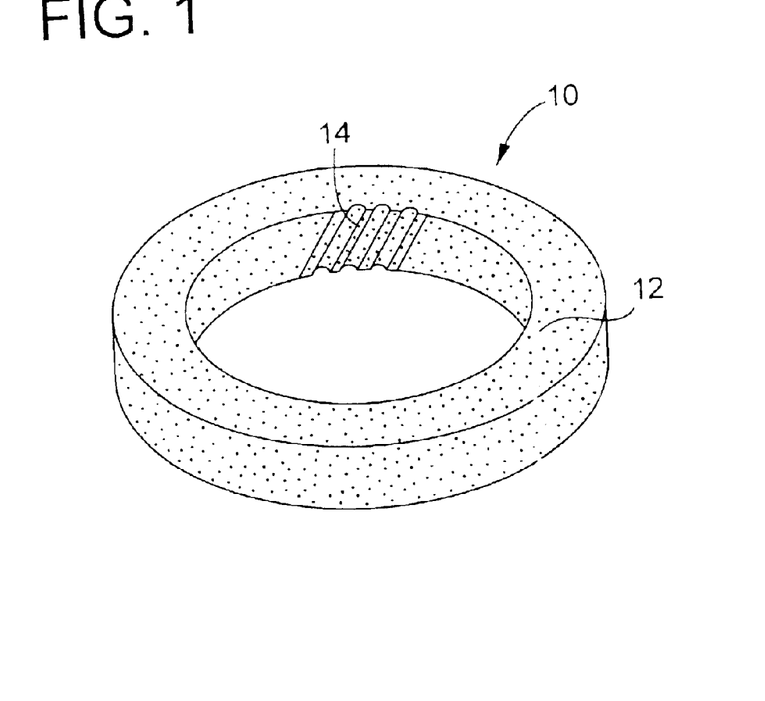
FIG. 1 is a perspective view showing a resinoid grindstone in the form of a gear-tooth honing stone constructed according to an embodiment of the invention.
Figure 2:
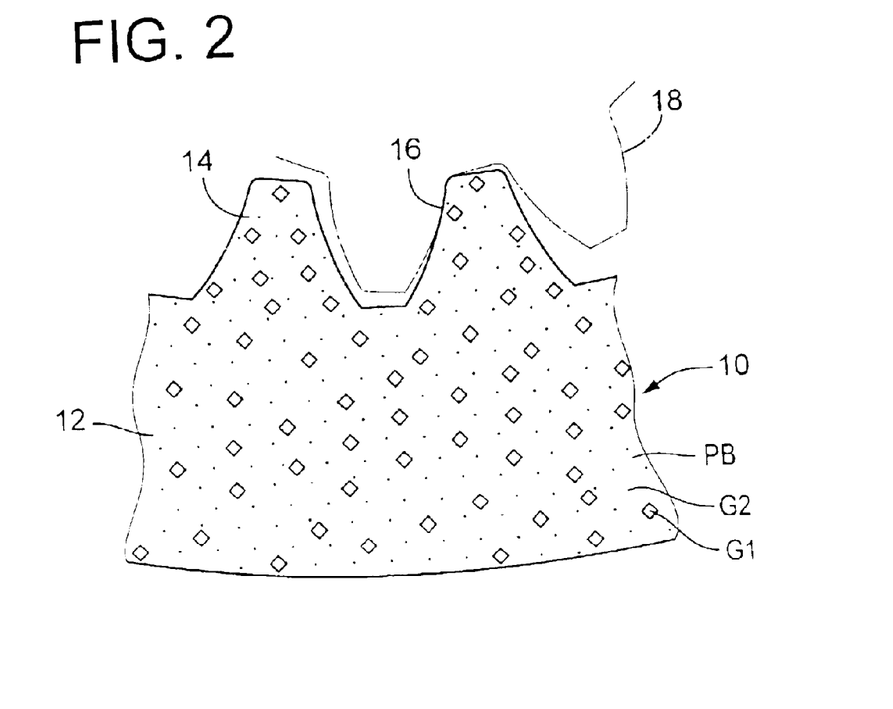
FIG. 2 is an enlarged view showing a part of a teeth profile portion of the gear-tooth honing stone of FIG. 1.

FIG. 1 is a perspective view showing the entirety of a grindstone in the form of a gear-tooth honing stone 10 which is constructed according to one embodiment of this invention. This gear-tooth honing stone 10 consists of an internally-toothed honing wheel constituted by an annular main body 12 having, in its inner circumferential surface, a teeth profile portion 14 which is integrally formed to be meshed with external teeth of a spur or helical gear 18 as a workpiece, for thereby grinding or honing the external teeth of the gear 18. The annular main body 12 has an outside diameter of about 300 mm, an inside diameter of about 250 mm and a width (axial length) of about 40 mm. The teeth profile portion 14 has a plurality of radially inwardly projecting protrusions or teeth which conform in shape to the external teeth of the gear 18, as shown in FIG. 2. In the present embodiment, each tooth of the teeth profile portion 14 consists of a helical tooth extending in a direction that is inclined with respect to an axial direction of the annular main body 12 by a predetermined angle. Each tooth of the teeth profile portion 14 has a module (m) of 2.0 and a pressure angle (P) of 17.5°. The number (Z) of the teeth of the teeth profile portion 14 is 120. It is noted that the inside diameter of the annular main body 12 corresponds to the diameter of an addendum circle or a cylindrical surface passing through tops of the teeth of the teeth profile portion 14.

The annular main body 12 including the teeth profile portion 14 is constituted by a resinoid abrasive structure in which abrasive agglomerates G1 are held together by a binder including a thermosetting resin bonding agent PB, such as an epoxy resin and a phenol resin. The binder further includes a filler G2 in the form of fine abrasive grains dispersed in the resin bond PB. Each of the abrasive agglomerates G1 has a size of about F6-8 (#6-8), while each of the abrasive grains G2 including a fused alumina white alundum (WA) has a size of about F100 (#100). This resinoid abrasive structure is represented by WA/X 100 R 7 Y according to JIS (Japan Industrial Standard), where "R" and "7" represent a grade and a structure density (grain percentage) of the abrasive structure, respectively. (The structure density of 7 is equivalent to the grain percentage of 48%.) The resinoid abrasive structure has an elastic modulus of about 10–15 GPa and a coefficient of thermal expansion of about $25 \times 10^{-6}/°C$. In the present embodiment, the fine abrasive grains G2 dispersed in the resin bond PB correspond to second abrasive grains.

Each of the abrasive agglomerates G1 is constituted by a vitrified abrasive structure in which abrasive grains Gs as first abrasive grains such as super abrasive grains (e.g., CBN) and standard abrasive grains (e.g., alundum and silicon carbide) are held together by an inorganic bond in the form of a vitrified bond Gb. Therefore, each of the abrasive agglomerates G1 has a size sufficiently larger than that of each of the first abrasive grains Gs included in each abrasive agglomerate G1, as is apparent from FIG. 3 which shows one of the abrasive agglomerates G1. Each abrasive agglomerate G1 contains the inorganic bond Gb such that a content of the inorganic bond Gb therein is 5–40 wt %, preferably 10–20 wt %, more preferably about 15 wt %. The remaining part of the abrasive agglomerate G1 is constituted by the plurality of first abrasive grains Gs. Since each of the first abrasive grains Gs has a size of F100(#100) or larger than F100 (#100), the size of each first abrasive grain Gs is substantially equal to or smaller than that of each of the above-described second abrasive grains G2 dispersed in the resin bond PB.

Figure 3:
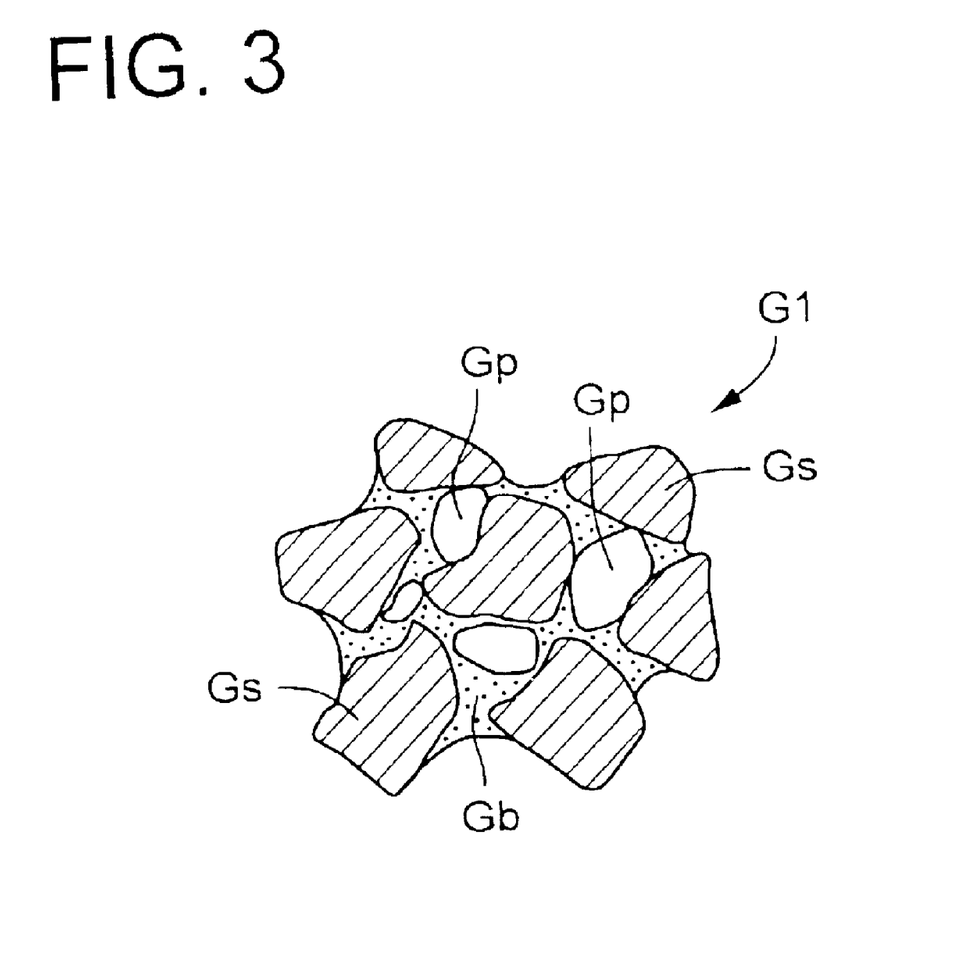
FIG. 3 is a view for explaining a construction of each of abrasive agglomerates included in an abrasive structure of the gear-tooth honing stone of FIG. 1.

Each of the abrasive agglomerates G1 is obtained, for example, by crushing an ordinary vitrified grindstone (including the first abrasive grains Gs held together by the vitrified bond Gb) into pieces, or alternatively, by directly forming an abrasive agglomerate (including the first abrasive grains Gs held by together by the vitrified bond Gb). In the former case, the vitrified grindstone formed in a press molding may be crushed either before or after the grindstone is fired. In the latter case, the abrasive agglomerate is formed by using caking additives, and is then burned. The thus formed abrasive agglomerate G1 has the same abrasive structure as an ordinary vitrified grindstone. That is, in the vitrified abrasive structure of the abrasive agglomerate G1, there are formed pores Gp among the first abrasive grains Gs held together by the vitrified bond Gb. The abrasive agglomerate G1 has a configuration complicated due to concavities and convexities in its surfaces. It is noted that each of the second abrasive grains G2 included in the binder consists of a single abrasive grain.

Figure 4:
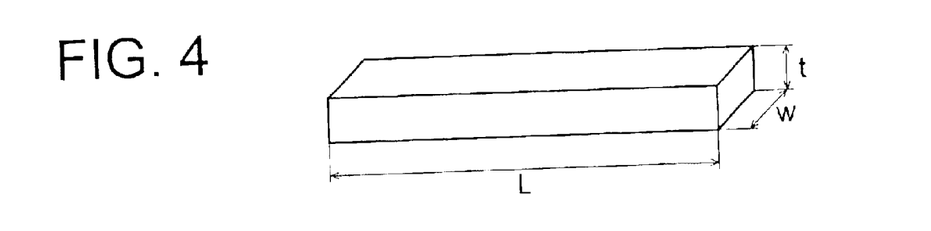
FIG. 4 is a perspective view of a test piece used in a three-point bending for measuring strengths of components of the gear-tooth honing stone of FIG. 1, i.e., a strength of the abrasive agglomerates G1 and a strength of the resin bond PB containing fine abrasive grains G2.
Figure 5:
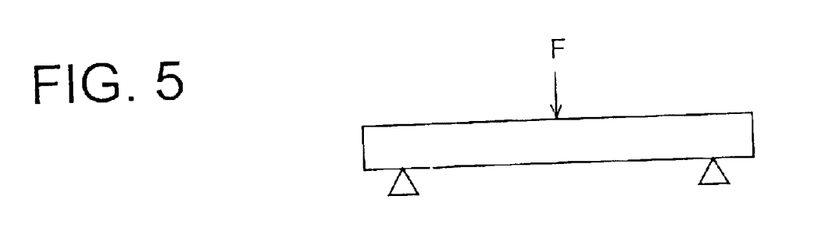
FIG. 5 is a view for explaining the three-point bending in which the test piece is supported at its end portion by two supports and receives a force F applied to its intermediate portion.

The abrasive agglomerate G1 formed as described above has a strength $S_G$ of 20–60 MPa and an elastic modulus of 15–40 GPa, while binder (containing the fine abrasive grains G2 as well as the resin bond PB) has a strength $S_{PB}$ of 70–150 MPa and an elastic modulus of 10–15 GPa. The producing conditions such as selection of materials and their mixing ratios are determined such that a ratio $S_G/S_{PB}$ of the strength $S_G$ of the abrasive agglomerate G1 to the strength $S_{PB}$ of the binder is not higher than 1.5, preferably lower than 1.0. Thus, the gear-tooth honing stone 10 as a whole has a strength of about 50–150 MPa. That is, the strength of gear-tooth honing stone 10 is not smaller than 50 MPa that is a minimum value required for a honing stone for honing teeth of a gear. It is noted that the strength of each component of the honing stone 10 is a transverse strength which can be measured, for example, in a three-point bending in which an elongated piece having a length L of 120 mm or more, a width W of 20 mm and a thickness t of 5 mm as shown in FIG. 4 is used as a test piece. In the three-point bending, the test piece is placed on two supports which are spaced apart from each other by 60 mm, and a force F is applied on the test piece between its supported end portions, as shown in FIG. 5. The transverse strength corresponds to a value of the force F as the test piece ruptures or fails.

Figure 6:
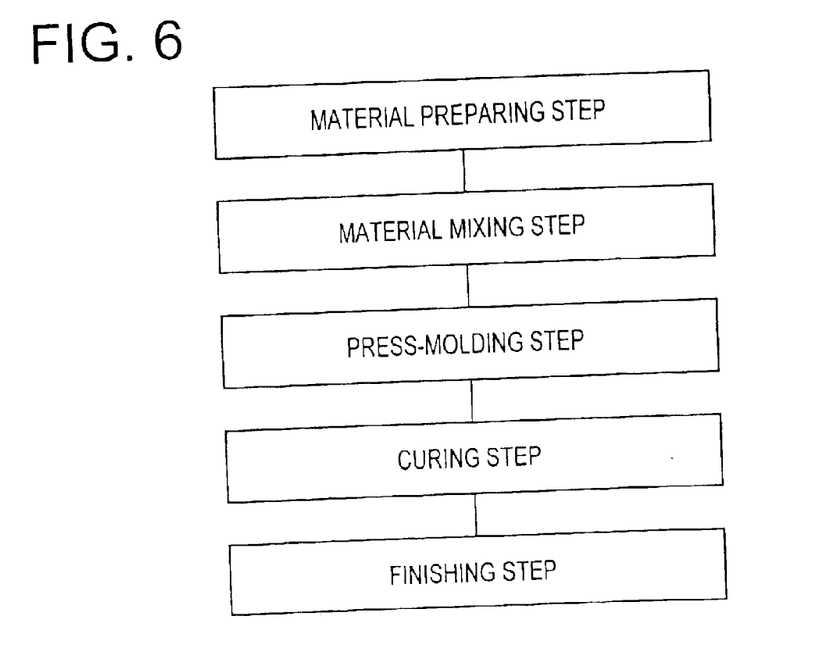
FIG. 6 is a process chart for explaining a process of manufacturing the gear-tooth honing stone of FIG. 1.

The gear-tooth honing stone 10 is produced in a known process for producing a resinoid grindstone, as shown in FIG. 6. The process is initiated with a material preparing step of preparing predetermined amount of materials which are weighed such that predetermined portions of the respective materials are obtained. In this material preparing step, 10–40 wt % (preferably 20–30 wt %) of abrasive agglomerates G1, 40–75 wt % of fine abrasive grains G2 and 15–30 wt % of resin-bond PB are prepared. The material preparing step is followed by a material mixing step of mixing the prepared materials. Then, in a press-molding step, the mixture is placed in a mold, and is compressed and heated in a press during a predetermined length of time, so as to form an annular abrasive mass. Then, a curing step is implemented to cure the formed abrasive mass at a predetermined temperature during a predetermined length of time, for stabilizing quality of the product. Finally, a finishing step is implemented to finish inner and outer circumferential surfaces of the abrasive mass, so as to obtain the annular main body 12. In this finishing step, the teeth profile of the inner circumferential surface of the annular abrasive mass is finished in a dressing operation.

Figure 7A:
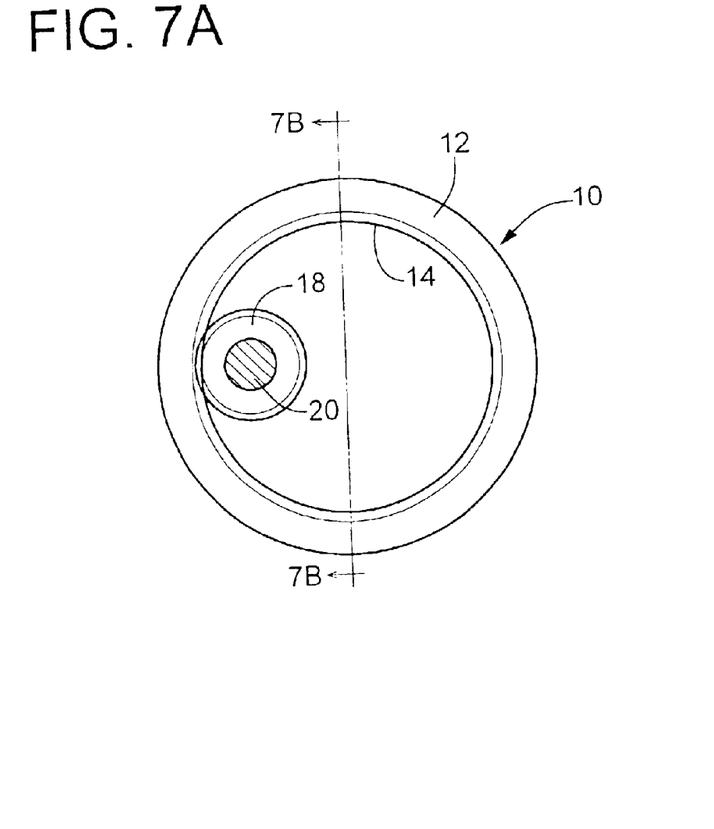
FIG. 7A is a view illustrating an operation in which a helical gear is honed or ground by the gear-tooth honing stone FIG. 1.
Figure 7B:
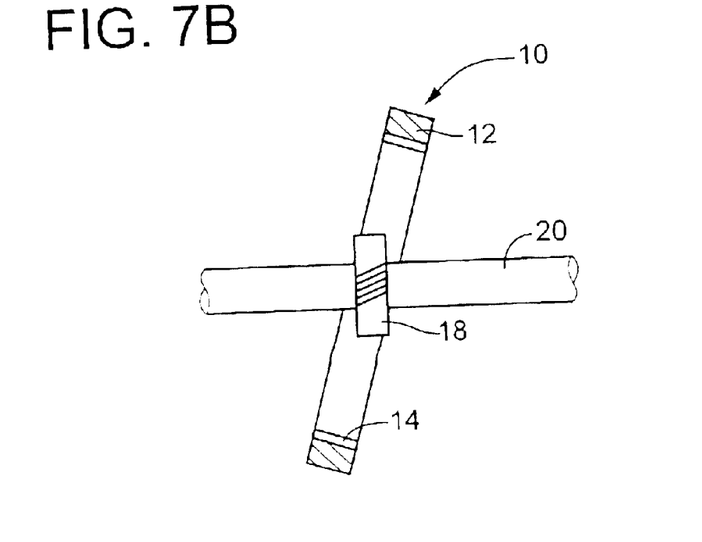
FIG. 7B is a view taken along line 7B—7B of FIG. 7A.

The gear-tooth honing stone 10 constructed as described above is a tool which is used in a gear-tooth grinding or honing operation, as shown in FIGS. 7A and 7B, for giving the work gear 18 (which have been hardened in a heat treatment) a required configurational accuracy. The work gear 18 in the form of a helical gear is mounted on a rotary mandrel or shaft 20 which is rotatably held at its axially opposite end portions (not shown), such that the work gear 18 and the rotary shaft 20 are rotatable together and are not displaceable relative to each other in the axial direction. With activation of a drive mechanism (not shown) associated with the rotary shaft 20, the work gear 18 together with the rotary shaft 20 is rotated about its axis and reciprocated in its axial direction. The gear-tooth honing stone 10 is rotatably held at its outer circumferential surface by a holder (not shown) so as to be positioned relative to the work gear 18 such that the honing stone 10 meshes at its teeth profile portion 14 with the work gear 18. That is, the axis of the honing stone 10 is inclined with respect to the axis of the work gear 18 by a predetermined angle as shown in FIG. 7B, and the axis of the honing stone 10 is distant from the axis of the work gear 18 by a predetermined distance as shown in FIG. 7A. During the honing operation, the work gear 18 is rotated by the drive mechanism while meshing with the honing stone 10, so that the honing stone 10 is rotated by the rotation of the work gear 18, whereby the teeth of the work gear 18 are ground by the teeth profile portion 14 of the honing stone 10 with high precision.

In the gear-tooth honing operation with the gear-tooth honing stone 10, the abrasive agglomerates G1 included in at least the teeth profile portion 14 are directly dedicated to the grinding or abrading of the work gear 18. The gear-tooth honing stone 10 is capable of grinding the work gear 18 with a larger depth of cut, than a conventional gear-tooth honing stone using ordinary abrasive grains to be brought into abrading contact with a workpiece. This is because each of the abrasive agglomerates G1 having a size larger than that of an ordinary abrasive grain is supported at its relatively large area by the resin binder so that each abrasive agglomerate G1 is not displaced by a large distance away from the work gear 18 during the honing operation. Further, the pores Gp formed in each abrasive grain G1 serve as so-called "chip pockets" for accommodating therein the removed stocks, providing the honing stone 10 with a sustainable honing capacity. Moreover, owing to the relatively large size and also the concavities and convexities in the surface of each abrasive agglomerate G1, each abrasive agglomerate G1 is held together by the binder with a high bonding strength, thereby reducing removals of the abrasive agglomerates G1 from the resinoid abrasive structure and accordingly improving the wear resistance. Thus, it is possible to obtain a high degree of surface smoothness of the ground workpiece without suffering from scratches which could be caused by the removal of a large amount of the abrasive agglomerates G1.

Further, in the resinoid abrasive structure of the gear-tooth honing stone 10 in which the content of the abrasive agglomerates G1 is 10–40 wt %, it is possible to enjoy the technical advantages provided by the abrasive agglomerates G1 while maintaining a sufficiently high degree of mechanical strength of about 50–150 MPa. Therefore, even if a large stress is applied from the tooth or teeth of the work gear 18 to a local part of the teeth profile portion 14 of the honing stone 10, the local portion of the teeth profile portion 14 is not likely to be broken or damaged. That is, the honing stone 10 as a whole has a mechanical strength sufficiently high for achieving a gear-tooth honing operation, although the honing stone 10 includes the abrasive agglomerates G1 whose mechanical strength is relatively low due to its vitrified abrasive structure in which the abrasive grains Gs are held together by the inorganic bond Gb.

Further, each of the abrasive agglomerates G1, in which the content of the inorganic bond Gb (holding the abrasive grains Gs) is 5–40 wt %, has a relatively low strength of about 20–60 MPa and a relatively low elastic modulus of about 15–40 GPa, so that each abrasive agglomerate G1 is easily broken down into smaller pieces, with application of a stress to the agglomerate G1 during the honing operation. This breakage of the agglomerate G1 makes is possible to provide the work gear 18 with a high degree of surface smoothness of about 1 $\mu$mRa.

Like a conventional gear-tooth honing stone, the gear-tooth honing stone 10 of this invention has to be periodically dressed so as to maintain accuracy of finishing the teeth of the work gear. That is, when the teeth profile of the honing stone 10 is changed to a certain extent due to wear of the teeth profile portion 14, or when the amount of wear of the teeth profile portion 14 exceeds a predetermined amount, the honing stone 10 has to be subjected to a dressing operation so as to rectify or reshape the teeth profile of the honing stone 10. This dressing operation can be executed, for example, by replacing the work gear 18 with a dressing tool in the form of a dressing gear identical in contour or shape with the work gear 18 and having a surface on which diamond abrasive grains are electrically deposited. Namely, the dressing gear, in place of the work gear 18, is mounted on the rotary shaft 20, and is then positioned relative to the honing stone 10 in the same manner as in the above-described positioning of the work gear 18 relative to the honing stone 10 as shown in FIGS. 7A and 7B. In this instance, the dressing gear is forced onto the inner circumferential surface of the annular main body 12 of the honing stone 10, so as to have a suitable amount of depth of cut. A relatively large stress acts on each tooth face 16 (as shown in FIG. 2) of the teeth profile portion 14 in a radially outward direction.

In the dressing operation, a large dressing load (e.g., stress, frictional heat) tends to be concentrated on each tooth top of the dressing gear which is more damageable than the other portion of the dressing gear. However, undesirable removal of the diamond abrasive grains deposited on each tooth top of the dressing gear is advantageously prevented owing to a low ratio of the strength of the abrasive agglomerates G1 to the strength of the binder (including the fine abrasive grains G2 as well as the resin bond PB), which ratio is not higher than 1.5, preferably lower than 1.0. Since the diamond abrasive grains are thus prevented from being removed from the dressing gear, the service life of the expensive dressing gear is prolonged while the ground surface of the work gear 18 is prevented from being considerably scratched. Further, since the gear-tooth honing stone 10 as a whole has a sufficiently high mechanical strength as described above, the dressing operation can be easily carried out without risk of damaging of the teeth profile portion 14.

There will be described an experiment that was conducted by the present inventors, for studying (a) a suitable grain size of each of the first abrasive grains Gs included in each abrasive agglomerate G1, (b) a suitable content of the inorganic bond Gb in each of the abrasive agglomerates G1 and (c) a suitable content of the abrasive agglomerates G1 in the resinoid abrasive structure. In the experiment, a honing operation is executed under conditions as specified below in Table 3, by using ten honing stones in the form of Examples 1–9 and one Comparative Example. Each of Examples 1–9 contains the abrasive agglomerates G1 as the above-described gear-tooth honing stone 10, while Comparative Example is substantially identical with Examples 1–9 except for the absence of abrasive agglomerates G1.

Each of Examples 1–9 has a resinoid abrasive structure whose composition is represented by WA/X 100 R 7 Y according to JIS (Japan Industrial Standard), where "R" and "7" represent a grade and a structure density of the resinoid abrasive structure, respectively. A design specific gravity of the resinoid abrasive structure is 2.37. The resinoid abrasive structure was prepared by mixing the abrasive agglomerates G1 (each having a size of about F6), the fine abrasive grains G2 (each consisting of white alundum and having a size of about F100) and the epoxy resin bond, with proportions of these components as indicated in the following Table 1.

TABLE 1

|  | Volumetric Proportions | Weight Proportions |
| --- | --- | --- |
| Sum of Agglomerates G1 and Grains G2 | 49 vol. % | 80 wt % |
| Epoxy Resin Bond | 40 vol. % | 20 wt % |

Examples 1–9, each containing the abrasive agglomerates G1, are different in content of the abrasive agglomerates G1 in the resinoid abrasive structure and in structure of each abrasive agglomerate G1. The abrasive agglomerates G1 of each of Examples 1–9 were obtained by crushing a vitrified grindstone into pieces, wherein the vitrified grindstone has a vitrified abrasive structure in which the first abrasive grains Gs in the form of WA (white alundum) grains are held together by the inorganic bond Gb. Table 2 indicates (a) the size of each of the first abrasive grains Gs included in each abrasive agglomerate G1, (b) the content of the inorganic bond Gb in each of the abrasive agglomerates G1 and (c) the content of the abrasive agglomerates G1 in the resinoid abrasive structure in each of Examples 1–9.

TABLE 2

|  | (a) Size of Abrasive Grains Gs included in each Abrasive Agglomerate G1 | (b) Content of Inorganic Bond Gb in each Abrasive Agglomerates G1 | (c) Content of Abrasive Agglomerates G1 in Resinoid Abrasive Structure |
| --- | --- | --- | --- |
| Example 1 | F60 | 20 wt % | 30 wt % |
| Example 2 | F100 | 20 wt % | 30 wt % |
| Example 3 | F150 | 20 wt % | 30 wt % |
| Example 4 | F100 | 5 wt % | 30 wt % |
| Example 5 | F100 | 20 wt % | 30 wt % |
| Example 6 | F100 | 40 wt % | 30 wt % |
| Example 7 | F100 | 20 wt % | 10 wt % |
| Example 8 | F100 | 20 wt % | 30 wt % |
| Example 9 | F100 | 20 wt % | 40 wt % |
| Comparative Example | — | — | 0 wt % |

Figure 8:
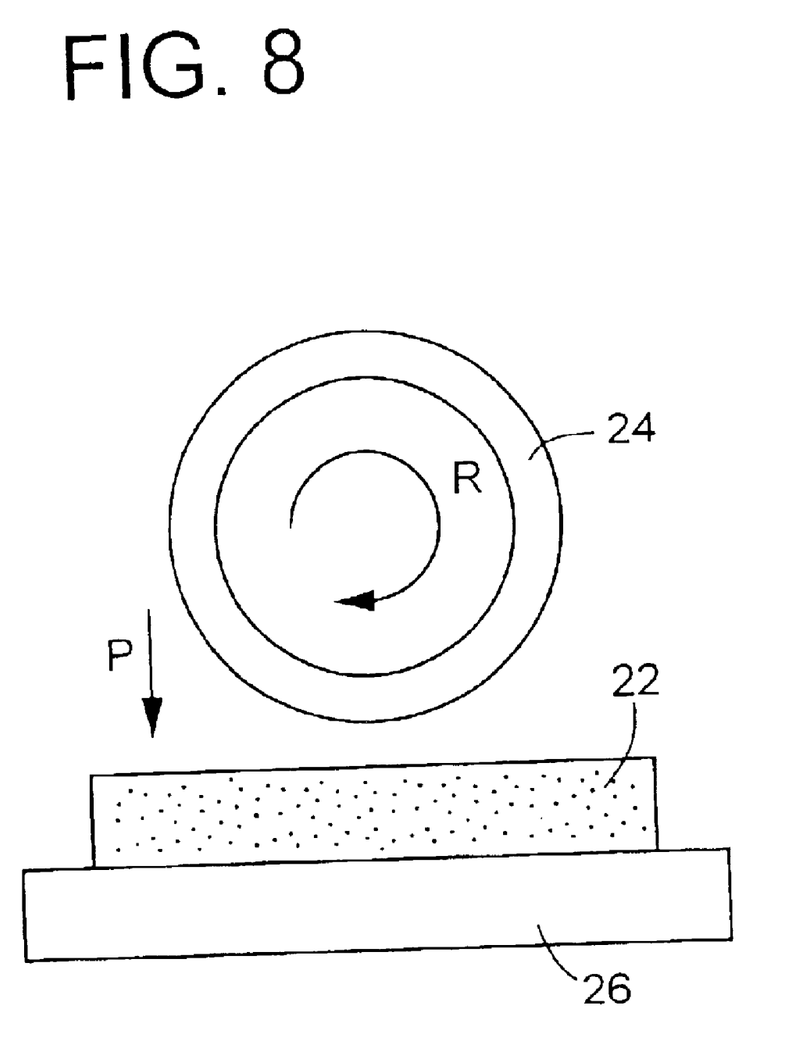
FIG. 8 is a view schematically showing an experiment conducted for studying suitable size and content of the components of the gear-tooth honing stone of FIG. 1.

For increasing reproducibility or repeatability of the experiment, or facilitating the experiment, each of Examples 1–9 and Comparative Example is provided by a honing stone 22 which is simpler in shape than the above-described gear-honing stone 10, while a workpiece 24 to be honed in the experiment is also simpler in shape than the above-described work gear 18, as shown in FIG. 8. In the honing operation of the experiment, the honing stone 22 in the form of a plate body was fixedly mounted on a metallic base plate 26, while the disk-shaped workpiece 24 was positioned above the honing stone 22. The disk-shaped workpiece 24, which was rotated about its axis parallel with the upper surface of the honing stone 22, was moved in a downward direction as indicated by arrow P so as to be given a predetermined amount of depth of cut. After the workpiece 24 had been given the predetermined amount of depth of cut, an amount of stock removed from the ground surface (outer circumferential surface) of the workpiece 24 was measured. Although the given amount of depth of cut was constant in each time of the honing operation, the amount of removed stock was gradually reduced as a result of gradual reduction in the honing or grinding performance of the honing stone 22, namely, as a result of gradual reduction in the sharpness of the honing stone 22. The honing operation was repeated while the current amount of removed stock is not smaller than 30% of the initial amount of removed stock (i.e., amount of removed stock in first-time honing operation). The honing operation was suspended when the current amount of removed stock was reduced to be smaller than 30% of the initial amount of removed stock, so that the dull honing stone 22 was subjected to a dressing operation. It is noted that the dressing operation is effected by using a dressing tool consisting of a disk-shaped body (identical in shape with the workpiece 24) having a surface on which diamond abrasive grains of F80 are electrically deposited.

TABLE 3

| Experiment Conditions | |
| --- | --- |
| Dimensions of Plate-like Honing Stone 22 | 150 mm (length) × 130 mm (width) × 20 mm (thickness) |
| Dimensions of Disk-shaped Workpiece 24 | Φ100 mm (outside diameter) × 12 mm (thickness) × Φ76.2 mm (inside diameter) |
| Material of Workpiece 24 | SCM420 |
| Number of revolutions of Workpiece 24 | 750 r.p.m |
| Grinding Fluid | Water immiscible fluid |
| Depth of cut | 120 μm |

Figure 9:
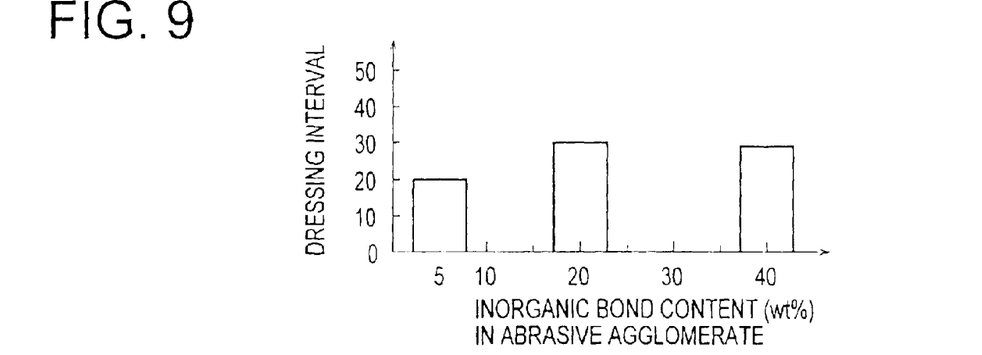
FIG. 9 is a graph representing a relationship between a dressing interval and an inorganic bond Gb content in each abrasive agglomerate G1, which relationship was confirmed in the experiment of FIG. 8.
Figure 10:
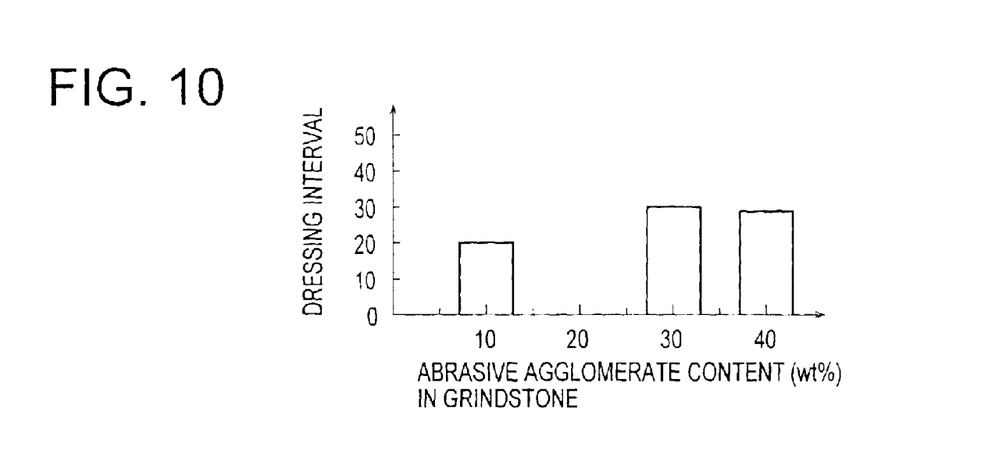
FIG. 10 is a graph representing a relationship between the dressing interval and an abrasive agglomerate G1 content in the grindstone, which relationship was confirmed in the experiment of FIG. 8.
Figure 11:
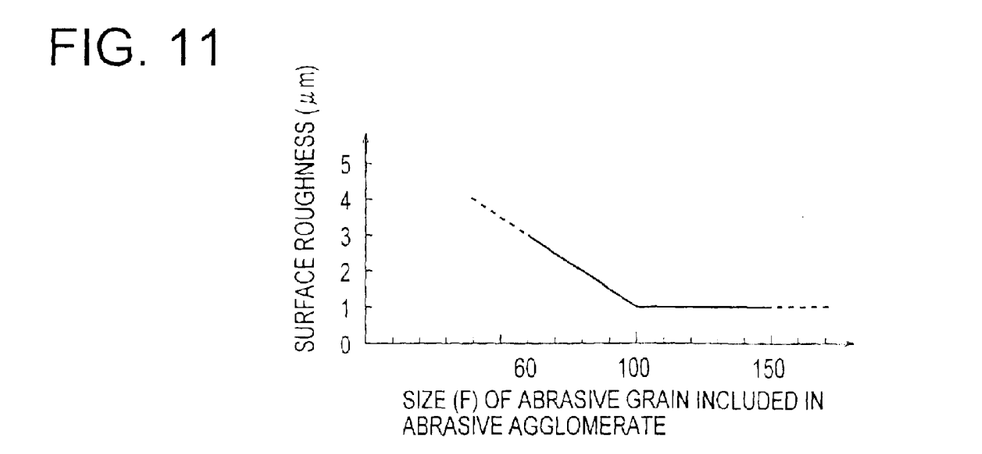
FIG. 11 is a graph representing a relationship between a surface roughness of a ground workpiece and a size of each of first abrasive grains Gs included in each abrasive agglomerate G1, which relationship was confirmed in the experiment of FIG. 8.

The result of the experiment is indicated in graphs of FIGS. 9–11. The graph of FIG. 9 represents a relationship between a dressing interval and the content of the inorganic bond Gb in each abrasive agglomerate G1. In a range in which the content of the inorganic bond Gb was relatively small, the dressing interval tended to be increased with an increase of the content of the inorganic bond Gb. However, this tendency was not confirmed in a range in which the content of the inorganic bond Gb was not relatively small. That is, a further increase in the content of the inorganic bond Gb exceeding 20 wt % leads to a slight reduction of the dressing interval rather than an increase of the dressing interval. Therefore, in view of the fact that the surface smoothness of the ground workpiece tends to be deteriorated with the increase of the inorganic bond Gb content, it is desirable to minimize the inorganic bond Gb content to such an extent that still assures a sufficiently large amount of the dressing interval. An excessively reduced content of the inorganic bond Gb disables the abrasive agglomerate G1 from maintaining its shape, or considerably reduces a bonding strength of the first abrasive grains Gs, thereby making it extremely difficult to produce the vitrified grindstone as a precursor of the abrasive agglomerates G1. In this respect, the inorganic bond Gb content is preferably at least 5 wt %. As is apparent from the graph of FIG. 9, the experiment revealed that the dressing interval can be extended owing to the presence of the abrasive agglomerates G1 as long as the inorganic bond Gb content is in the range of 5–40 wt %. Further, for maximizing the performance with respect of the smoothness of the ground surface, it is preferable that the inorganic bond Gb content is in the range of 15–30 wt %, since the technical effect of the inorganic bond Gb does not increase with a further increase of the inorganic bond Gb content over 20 wt %. The experiment revealed that an ideal value of the inorganic bond Gb content is about 20 wt %, since the largest dressing interval is obtained without deteriorating the surface smoothness of the ground workpiece 24 when the workpiece 24 was ground by the honing stones in which the inorganic bond Gb content is 20 wt %. It is noted that the dressing interval may be expressed by the number of times the honing operation could be repeated after each dressing operation was made on the honing stone 22 before the amount of the removed stock was reduced to the above-described value, namely, before the next dressing operation was required for the honing stone 22.

Figure 12:
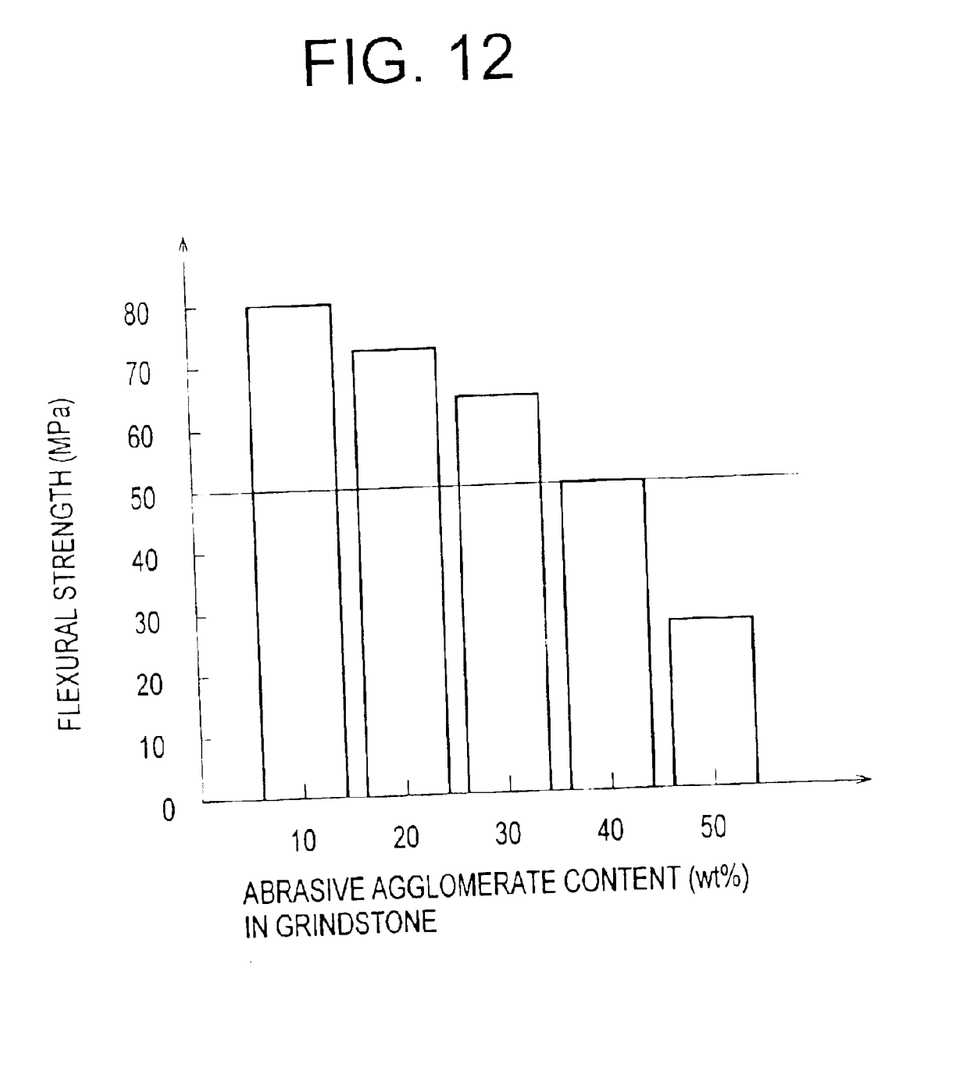
FIG. 12 is a graph representing a relationship between a flexural strength of the grindstone and the abrasive agglomerate G1 content in the grindstone.

The graph of FIG. 10 represents a relationship between the dressing interval and the content of the abrasive agglomerates G1 in the resinoid abrasive structure. In a range in which the content of the abrasive agglomerates G1 was relatively small, the dressing interval tended to be increased with an increase of the content of the abrasive agglomerates G1. However, this tendency was not confirmed in a range in which the content of the abrasive agglomerates G1 was not relatively small. That is, the further increase of the abrasive agglomerates G1 content over 30 wt % leads to a slight reduction of the dressing interval rather than an increase of the dressing interval. Further, as shown in a graph of FIG. 12 which represents a relationship between the flexural or transverse strength of the abrasive structure and the content of the abrasive agglomerates G1, the transverse strength of the abrasive structure tends to be reduced with the increase of the content of the abrasive agglomerates G1, so that an excessively large content of the abrasive agglomerates G1 disables the abrasive structure from having a required degree of transverse strength. For example, the gear-tooth honing stone 10 requires to have, preferably, a transverse strength of at least 50 MPa as measured in a three-point bending. If the content of the abrasive agglomerates G1 exceeds 40 wt %, the transverse strength is reduced to be smaller than this preferable minimum value, i.e., 50 MPa. If the content of the abrasive agglomerates G1 is as high as 50 wt %, the transverse strength is further reduced to be about a half of the preferable minimum value, i.e., about 25 MPa. As shown in the graph of FIG. 10, when the honing operation were executed with the honing stone 22 of Example 7 in which the content of the abrasive agglomerates G1 is as low as about 10 wt %, the dressing operation could be repeated 20 times without interruption by the dressing operation. Namely, with the content of the abrasive agglomerates G1 being 10 wt %, the amount of the dressing interval was 20, which was larger than 15 (not shown) as the amount of the dressing interval when the honing operation was executed with the honing stone 22 of Comparative Example which does not contain the abrasive agglomerate G1. This means that the dressing interval was increased even by the low content of the abrasive agglomerates G1. It can be said that the content of the abrasive agglomerates G1 in the abrasive structure of the grindstone is preferably 10–40 wt %, more preferably 30 wt %.

The graph of FIG. 11 represents a relationship between the surface roughness of the ground workpiece and the size of each of the first abrasive grains Gs included in each abrasive agglomerate G1. In a range in which the size of each first abrasive grain Gs is not larger than F100, i.e., the size of each second abrasive grain G2, it is possible to obtain a high degree of surface accuracy, i.e., a high degree of surface smoothness. However, in another range in which the size of each first abrasive grain Gs is larger than the size of each second abrasive grain G2, the surface roughness is increased, namely, the surface smoothness is deteriorated with an increase of the size of each first abrasive grain Gs. Therefore, it is preferable that the size of each of the first abrasive grains Gs (included in each abrasive agglomerate G1) is not larger than the size of each of the second abrasive grains G2 (included in the resin bond PB).

The grain size of the first abrasive grains Gs included in each abrasive agglomerate G1, the content of the inorganic bond Gb in each abrasive agglomerate G1 and the content of the abrasive agglomerates G1 in the resinoid abrasive structure of the above-described gear-tooth honing stone 10 constructed according to the embodiment of the invention were determined in accordance with the result of the experiment as described above.

While the presently preferred embodiment of the present invention has been described above with a certain degree of particularity, by reference to the accompanying drawings, it is to be understood that the invention is not limited to the details of the illustrated embodiment, but may be otherwise embodied.

In the above-described embodiment, the grindstone takes the form of the internally-toothed honing wheel 10 constituted by the annular main body 12 having, in its inner circumferential surface, the teeth profile portion 14 to be meshed with the external teeth of the work gear 18, for thereby honing the external teeth of the gear 18. However, the grindstone of the present invention may take the form of an externally-toothed honing wheel constituted by a main body having, in its outer circumferential surface, a teeth profile portion for honing an internal teeth of a work gear. Further, the principle of the invention is also applicable to a grindstone for grinding or reshaping a cutting tool, or any kinds of grindstone other than a gear-tooth honing stone.

In the above-described embodiment, the content of the inorganic bond Gb in each abrasive agglomerate G1 is held in the range of 5–40 wt %. However, the inorganic bond Gb content may be modified in view of a required degree of mechanical strength of each abrasive agglomerate G1 and a required degree of bonding strength for holding the first abrasive grains Gs together. That is, the inorganic bond Gb content may be larger than 40 wt % or smaller than 5 wt %, as long as the required degrees of mechanical and bonding strengths are obtained.

While the grain size of the first abrasive grains Gs constituting each abrasive agglomerate G1 is not larger than that of the second abrasive grains G2 dispersed in the resin bond PB in the above-described embodiment, the grain size of either of the first and second abrasive grains Gs, G2 may be increased within a range which assures a required degree of surface smoothness of the ground workpiece.

In the above-described embodiment, the second abrasive grains G2 consisting of white alundum (WA) grains are dispersed in the resin bond PB, so that the while alundum grains as well as the resin bond PB is included in the binder. The white alundum grains may be replaced with any other kind of abrasive grains or any other kind of filler made of an inorganic material. Further, the filler such as second abrasive grains G2 does not have to be necessarily included in the binder. However, it is preferable that the second abrasive grains G2 as well as the abrasive agglomerates G1 are dispersed in the resin bond PB. This is because, if the bonding strength of the grindstone is intended to be increased without the presence of the second abrasive grains G2, the content of the resin bond PB has to be inevitably increased. An excessively high content of the resin bond PB makes it difficult to obtain a high degree of grain percentage of the grindstone which is required for increasing the grinding efficiency of the grindstone. The increase in both of the grain percentage and the bonding strength of the grindstone is facilitated by the presence of the second abrasive grains G2.

In the above-described embodiment, the abrasive agglomerates G1 are distributed evenly over the entirety of the annular main body 12, as shown in FIG. 2. However, the abrasive agglomerates G1 may be provided in a limited portion of the main body 12 such as the teeth profile portion 14 which serves to abrade a workpiece in a honing operation.

While each of the abrasive agglomerates G1 includes the white alundum (WA) grains as the second abrasive grains G2 held together by the vitrified bond in the above-described embodiment, the white alundum (WA) grains may be replaced with other kinds of abrasive grains such as CBN abrasive grains, diamond abrasive grains and silicon carbide abrasive grains.

While each first abrasive grain Gs and each second abrasive grain G2 are provided by the same kind of abrasive grains, i.e., the white alundum (WA) grains in the above-described embodiment, the first and second abrasive grains Gs, G2 may be provided by respective different kinds of abrasive grains. Further, methods of preparing the first and second abrasive grains Gs, G2 are not particularly limited.

While the presently preferred embodiment of the present invention has been illustrated above, it is to be understood that the invention is not limited to the details of the illustrated embodiment, but may be embodied with various other changes, modifications and improvements, which may occur to those skilled in the art, without departing from the spirit and scope of the invention defined in the following claims.

What is claimed is:

1. A resinoid grindstone, comprising:
   a main body having an abrasive structure in which abrasive agglomerates are held together by a binder including a resin bond,
   wherein each of the abrasive agglomerates includes abrasive grains which are held together by an inorganic bond,
   and wherein the binder further includes a filler such that a ratio of a strength of the abrasive agglomerates to a strength of the binder is not higher than 1.5.

2. A resinoid grindstone according to claim 1, wherein the strength of the abrasive agglomerates is smaller than the strength of the binder.

3. A resinoid grindstone according to claim 1, wherein the filler is provided by second abrasive grains each having a size which is not smaller than a size of each of the abrasive grains as first abrasive grains included in each of the abrasive agglomerates.

4. A gear-tooth honing stone, comprising:
   a main body having a teeth profile portion to be meshed with a gear, for honing the gear,
   wherein the main body has an abrasive structure in which abrasive agglomerates are held together by a binder including a resin bond,
   wherein each of the abrasive agglomerates includes abrasive grains which are held together by an inorganic bond,
   and wherein the binder further includes a filler such that a ratio of a strength of the abrasive agglomerates to a strength of the binder is not higher than 1.5.

5. A gear-tooth honing stone according to claim 4, wherein the strength of the abrasive agglomerates is smaller than the strength of the binder.

6. A gear-tooth honing stone according to claim 4, wherein the filler is provided by second abrasive grains each having a size which is not smaller than a size of each of the abrasive grains as first abrasive grains included in each of the abrasive agglomerates.

7. A gear-tooth honing stone according to claim 4, wherein the main body includes an annular body, and wherein the teeth profile portion is provided by a succession of protrusions formed in an inner circumferential surface of the annular body.

8. A resinoid grindstone comprising:
   a main body having an abrasive structure in which abrasive agglomerates are held together by a binder including a resin bond,
   wherein each of the abrasive agglomerates includes abrasive grains which are held together by an inorganic bond,
   wherein a ration of a total weight of the abrasive agglomerates included in the abrasive structure, to a weight of the abrasive structure is not lower than 10% and is not higher than 40%,
   and wherein a ratio of a weight of the inorganic bond included in each of the abrasive agglomerates, to a weight of each of the abrasive agglomerates is not higher than 40%.

9. A resinoid grindstone according to claim 8, wherein the ratio of the total weight of the abrasive agglomerates included in the abrasive structure, to the weight of the abrasive structure is not higher than 30%.

10. A resinoid grindstone according to claim 8, wherein the ratio of the weight of the inorganic bond included in each of the abrasive agglomerates, to the weight of each of the abrasive agglomerates is not lower than 5%.

11. A resinoid grindstone according to claim 8, the resinoid grindstone being a gear-tooth honing stone, wherein the main body has a teeth profile portion to be meshed with a gear, for honing the gear.

12. A resinoid grindstone according to claim 11, wherein the main body includes an annular body, and wherein the teeth profile portion is provided by a succession of protrusions formed in an inner circumferential surface of the annular body.

13. A resinoid grindstone comprising:
   a main body having an abrasive structure in which abrasive agglomerates are held together by a binder including a resin bond,
   wherein each of the abrasive agglomerates includes abrasive grains which are held together by an inorganic bond,
   wherein a ratio of a total weight of the abrasive agglomerates included in the abrasive structure, to a weight of the abrasive structure is not lower than 10% and is not higher than 40%,
   and wherein the binder further includes second abrasive grains each having a size which is not smaller than a size of each of the abrasive grains as first abrasive grains included in each of the abrasive agglomerates, and which is smaller than a size of each of the abrasive agglomerates.

* * * * *